US011606810B2

(12) United States Patent
Nam et al.

(10) Patent No.: US 11,606,810 B2
(45) Date of Patent: Mar. 14, 2023

(54) SIDELINK COMMUNICATION RESOURCE SIGNALING

(71) Applicant: QUALCOMM Incorporated, San Diego, CA (US)

(72) Inventors: Wooseok Nam, San Diego, CA (US); Junyi Li, Chester, NJ (US); Tao Luo, San Diego, CA (US); Sony Akkarakaran, Poway, CA (US)

(73) Assignee: Qualcomm Incorporated, San Diego, CA (US)

( * ) Notice: Subject to any disclaimer, the term of this patent is extended or adjusted under 35 U.S.C. 154(b) by 3 days.

(21) Appl. No.: 16/928,709

(22) Filed: Jul. 14, 2020

(65) Prior Publication Data

US 2021/0022173 A1 Jan. 21, 2021

Related U.S. Application Data

(60) Provisional application No. 62/876,411, filed on Jul. 19, 2019.

(51) Int. Cl.
*H04W 72/14* (2009.01)
*H04W 76/11* (2018.01)
(Continued)

(52) U.S. Cl.
CPC ........... *H04W 72/14* (2013.01); *H04W 24/08* (2013.01); *H04W 72/02* (2013.01);
(Continued)

(58) Field of Classification Search
CPC ..... H04W 72/14; H04W 76/11; H04W 24/08; H04W 72/02; H04W 72/042; H04W 92/18
See application file for complete search history.

(56) References Cited

U.S. PATENT DOCUMENTS

2016/0338094 A1* 11/2016 Faurie ................. H04W 72/085
2017/0127405 A1* 5/2017 Agiwal ............... H04W 72/048
(Continued)

FOREIGN PATENT DOCUMENTS

EP 3512118 A1 7/2019
WO 2016181094 A1 11/2016

OTHER PUBLICATIONS

Intel Corporation: "Design Options for eNB-Controlled and Relay UE-Assisted Resource Allocation", 3GPP TSG RAN WG1 Meeting#90, 3GPP Draft; R1-1712519 Intel—FED2D Modes, 3rd Generation Partnership Project(3GPP), Mobile Competence Centre ; 650,Route Des Lucioles ; F-06921 Sophia-Antipolis Cedex ; France vol. RAN WG1, No. Prague, Czech Republic; Aug. 21, 2017-Aug. 25, 2017, Aug. 20, 2017 (Aug. 20, 2017), pp. 1-7, XP051315335, Retrieved from the Internet: URL: http://www.3gpp.org/ftp/Meetings_3GPP_SYNC/RAN1/Docs/, [retrieved on Aug. 20. 2017], the whole document.

(Continued)

*Primary Examiner* — Michael J Moore, Jr.
(74) *Attorney, Agent, or Firm* — Harrity & Harrity, LLP

(57) ABSTRACT

Various aspects of the present disclosure generally relate to wireless communication. In some aspects, a base station (BS) may receive an indication of a sidelink communication queued for communication between a source user equipment (UE) and a target UE. The BS may transmit, via another link, a sidelink resource grant to identify one or more resources for the sidelink communication for the source UE and the target UE on a sidelink. Numerous other aspects are provided.

30 Claims, 12 Drawing Sheets

(51) Int. Cl.
*H04W 24/08* (2009.01)
*H04W 72/02* (2009.01)
*H04W 72/04* (2023.01)
*H04W 92/18* (2009.01)

(52) U.S. Cl.
CPC .......... *H04W 72/042* (2013.01); *H04W 76/11* (2018.02); *H04W 92/18* (2013.01)

(56) References Cited

U.S. PATENT DOCUMENTS

| | | | |
|---|---|---|---|
| 2017/0150330 A1* | 5/2017 | Kim | H04W 48/16 |
| 2017/0208646 A1* | 7/2017 | Siomina | H04W 76/14 |
| 2017/0359835 A1* | 12/2017 | Seo | H04W 72/14 |
| 2018/0054237 A1 | 2/2018 | Tseng et al. | |
| 2019/0208539 A1* | 7/2019 | Christoffersson ... | H04W 72/042 |
| 2020/0092685 A1* | 3/2020 | Feh | H04B 7/2606 |
| 2020/0229143 A1* | 7/2020 | Wei | H04L 41/14 |
| 2020/0229195 A1* | 7/2020 | Lien | H04L 5/0098 |
| 2021/0168814 A1* | 6/2021 | Chen | H04W 72/0493 |
| 2021/0297221 A1* | 9/2021 | Lee | H04L 5/0055 |
| 2021/0377993 A1* | 12/2021 | Ayaz | H04W 76/14 |

OTHER PUBLICATIONS

International Search Report and Written Opinion—PCT/US2020/042114—ISA/EPO—dated Sep. 29, 2020.

* cited by examiner

SIDELINK COMMUNICATION RESOURCE SIGNALING

CROSS-REFERENCE TO RELATED APPLICATION

This Patent Application claims priority to U.S. Provisional Patent Application No. 62/876,411, filed on Jul. 19, 2019, entitled "SIDELINK COMMUNICATION RESOURCE SIGNALING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for sidelink communication resource signaling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies.

SUMMARY

In some aspects, a method of wireless communication, performed by a target user equipment (UE), may include receiving, from a serving base station (BS), a sidelink resource grant that identifies one or more resources for sidelink reception from a source UE; activating monitoring of a sidelink based at least in part on receiving the sidelink resource grant; and monitoring the one or more resources on the sidelink to receive a sidelink communication from the source UE based at least in part on activating the monitoring of the sidelink.

In some aspects, a UE for wireless communication may include memory and one or more processors operatively coupled to the memory. The memory and the one or more processors may be configured to receive, from a serving BS, a sidelink resource grant that identifies one or more resources for sidelink reception from a source UE; activate monitoring of a sidelink based at least in part on receiving the sidelink resource grant; and monitor the one or more resources on the sidelink to receive a sidelink communication from the source UE based at least in part on activating the monitoring of the sidelink.

In some aspects, a non-transitory computer-readable medium may store one or more instructions for wireless communication. The one or more instructions, when executed by one or more processors of a UE, may cause the one or more processors to receive, from a serving BS, a sidelink resource grant that identifies one or more resources for sidelink reception from a source UE; activate monitoring of a sidelink based at least in part on receiving the sidelink resource grant; and monitor the one or more resources on the sidelink to receive a sidelink communication from the source UE based at least in part on activating the monitoring of the sidelink.

In some aspects, an apparatus for wireless communication may include means for receiving, from a serving BS, a sidelink resource grant that identifies one or more resources for sidelink reception from a source UE; means for activating monitoring of a sidelink based at least in part on receiving the sidelink resource grant; and means for monitoring the one or more resources on the sidelink to receive a sidelink communication from the source UE based at least in part on activating the monitoring of the sidelink.

In some aspects, a method of wireless communication, performed by a BS, may include receiving an indication of a sidelink communication queued for communication between a source UE and a target UE; and transmitting, via another link, a sidelink resource grant to identify one or more resources for the sidelink communication for the source UE and the target UE on a sidelink.

In some aspects, a BS for wireless communication may include memory and one or more processors operatively coupled to the memory. The memory and the one or more processors may be configured to receive an indication of a sidelink communication queued for communication between a source UE and a target UE; and transmit, via another link, a sidelink resource grant to identify one or more resources for the sidelink communication for the source UE and the target UE on a sidelink.

In some aspects, a non-transitory computer-readable medium may store one or more instructions for wireless communication. The one or more instructions, when executed by one or more processors of a B S, may cause the one or more processors to receive an indication of a sidelink communication queued for communication between a source UE and a target UE; and transmit, via another link, a sidelink resource grant to identify one or more resources for the sidelink communication for the source UE and the target UE on a sidelink.

In some aspects, an apparatus for wireless communication may include means for receiving an indication of a sidelink communication queued for communication between a source UE and a target UE; and means for transmitting, via another link, a sidelink resource grant to identify one or more resources for the sidelink communication for the source UE and the target UE on a sidelink.

Aspects generally include a method, apparatus, system, computer program product, non-transitory computer-readable medium, user equipment, base station, wireless communication device, and/or processing system as substantially described herein with reference to and as illustrated by the accompanying drawings and/or specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
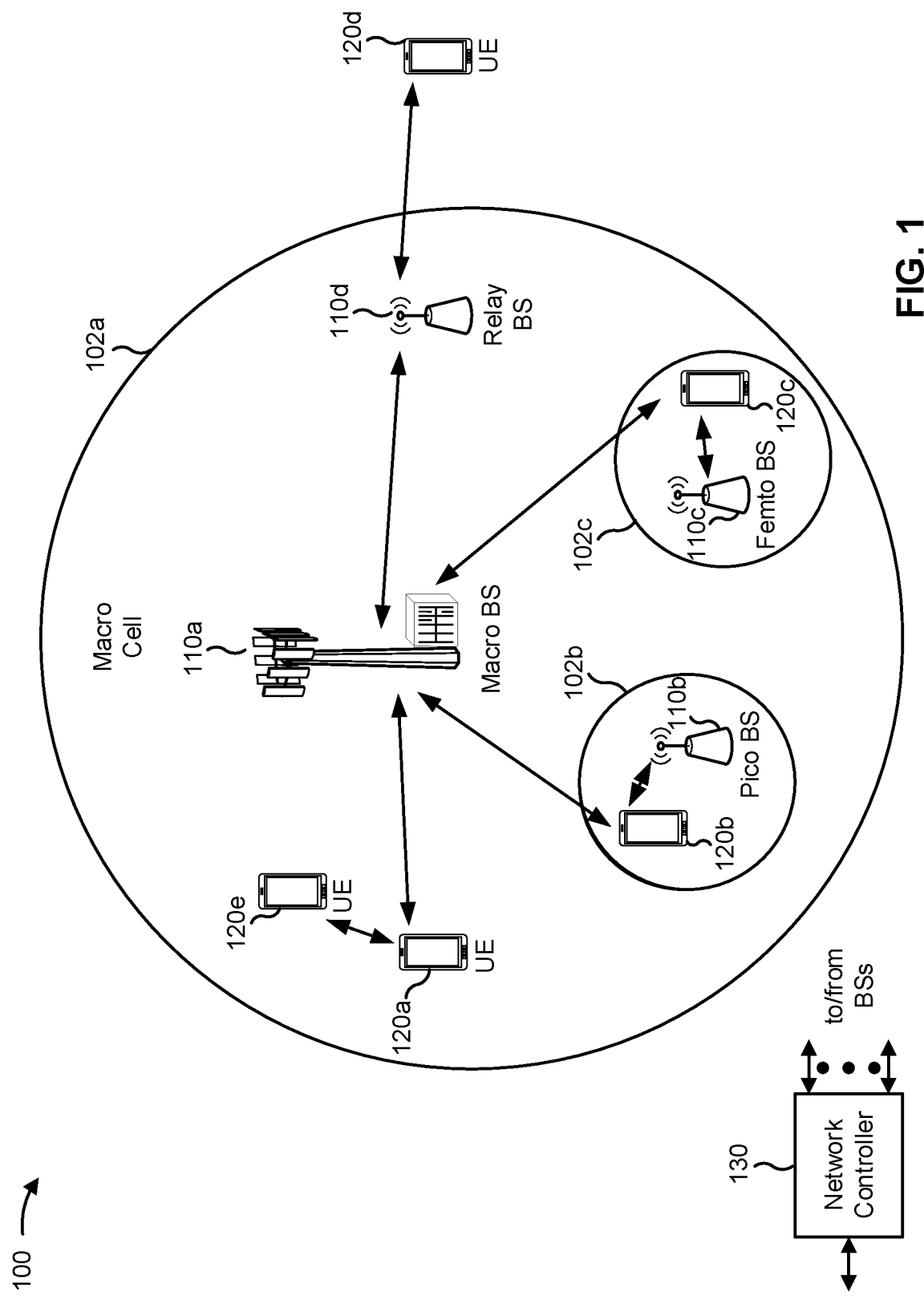
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c, 120d, 120e) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
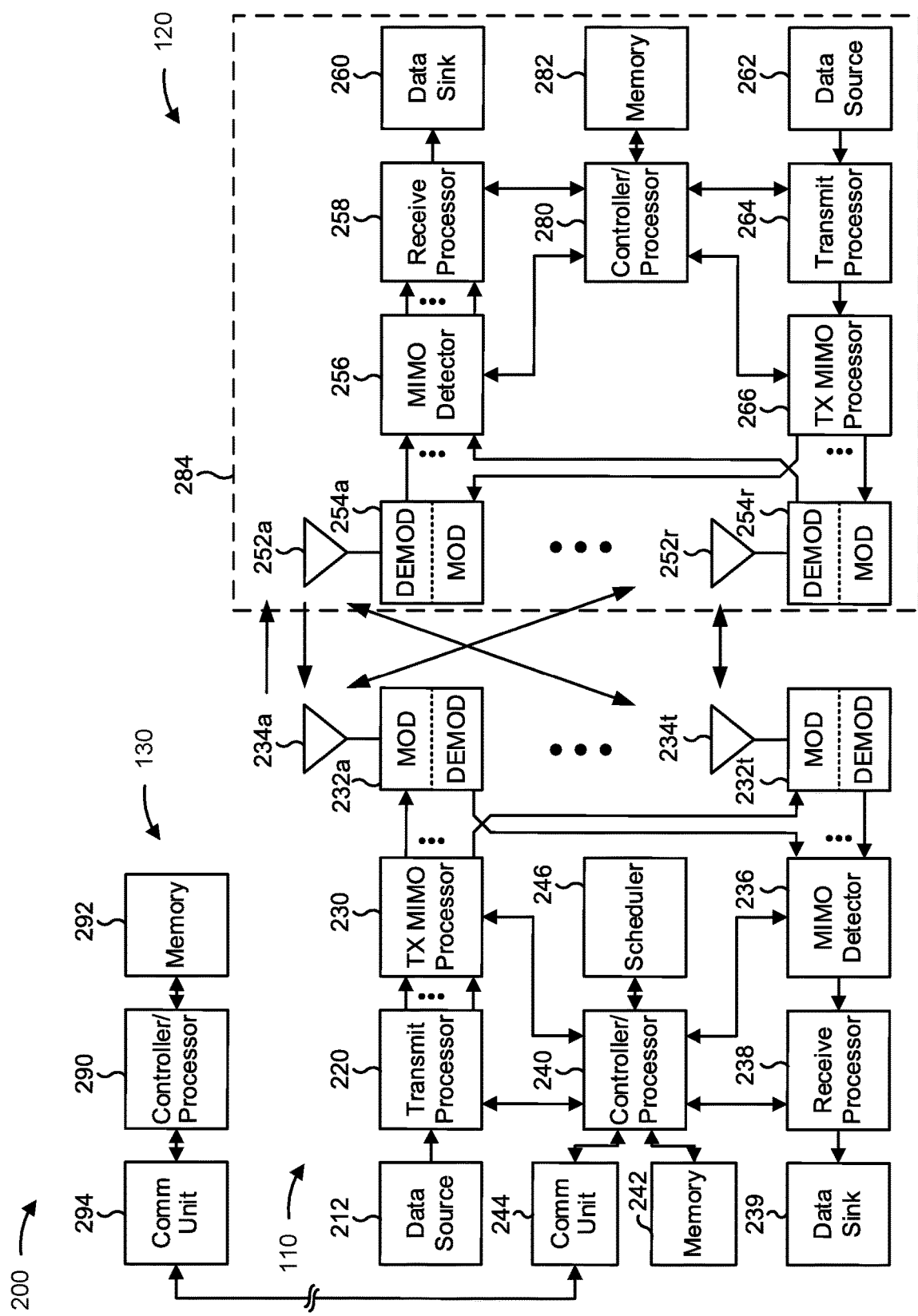
FIG. 2 is a block diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with sidelink communication resource signaling, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8, process 900 of FIG. 9 and/or other processes as described herein. A scheduler 246 may schedule UEs for data transmission on the downlink and/or uplink.

In some aspects, a target UE 120 may include means for receiving, from a serving BS, a sidelink resource grant that identifies one or more resources for sidelink reception from a source UE, means for activating monitoring of a sidelink based at least in part on receiving the sidelink resource grant, means for monitoring the one or more resources on the sidelink to receive a sidelink communication from the source UE based at least in part on activating the monitoring of the sidelink, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving an indication of a sidelink communication queued for communication between a source UE and a target UE, means for transmitting, via another, a sidelink resource grant to identify one or more resources for the sidelink communication for the source UE and the target UE on a sidelink, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3A:
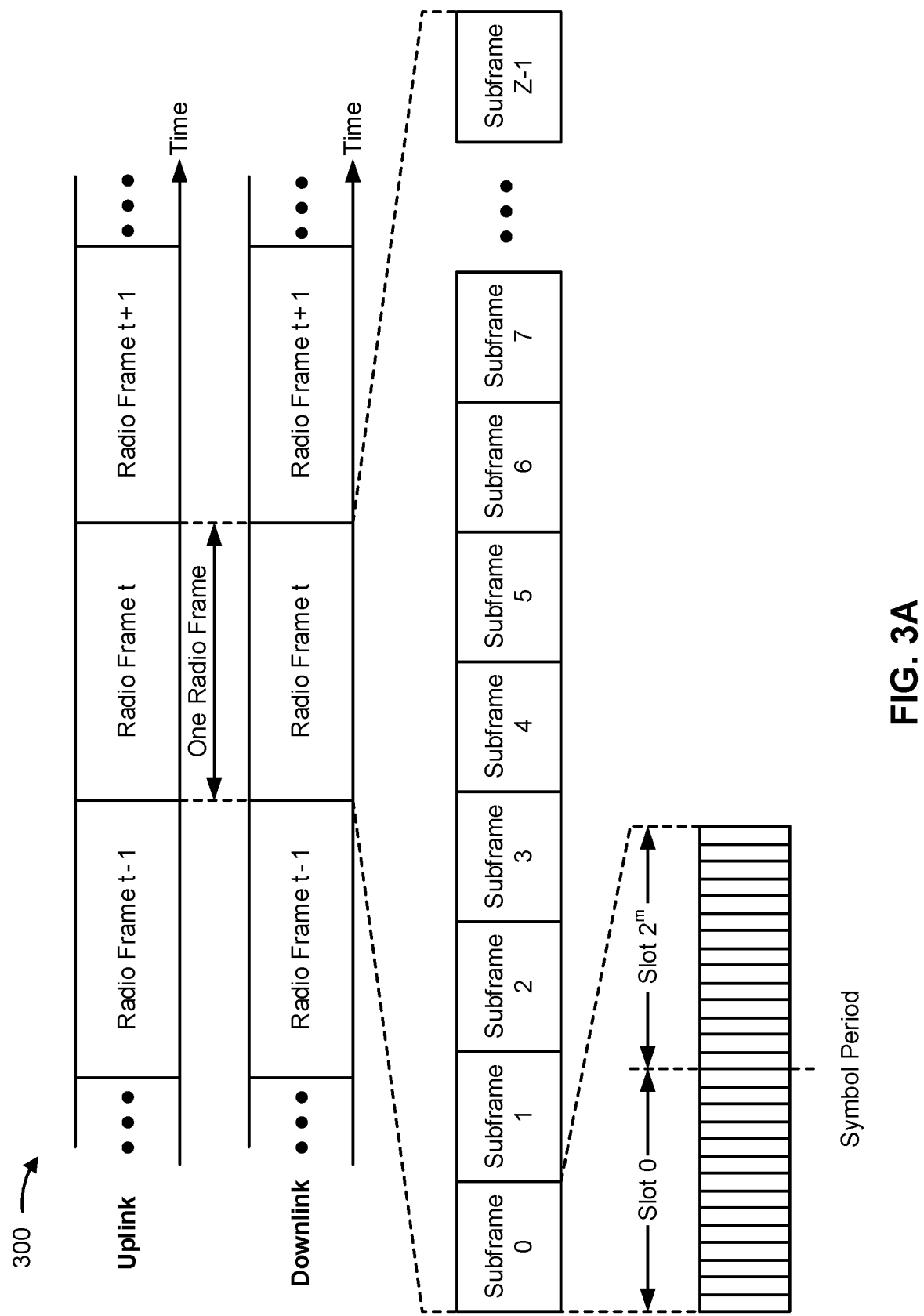
FIG. 3A is a block diagram illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
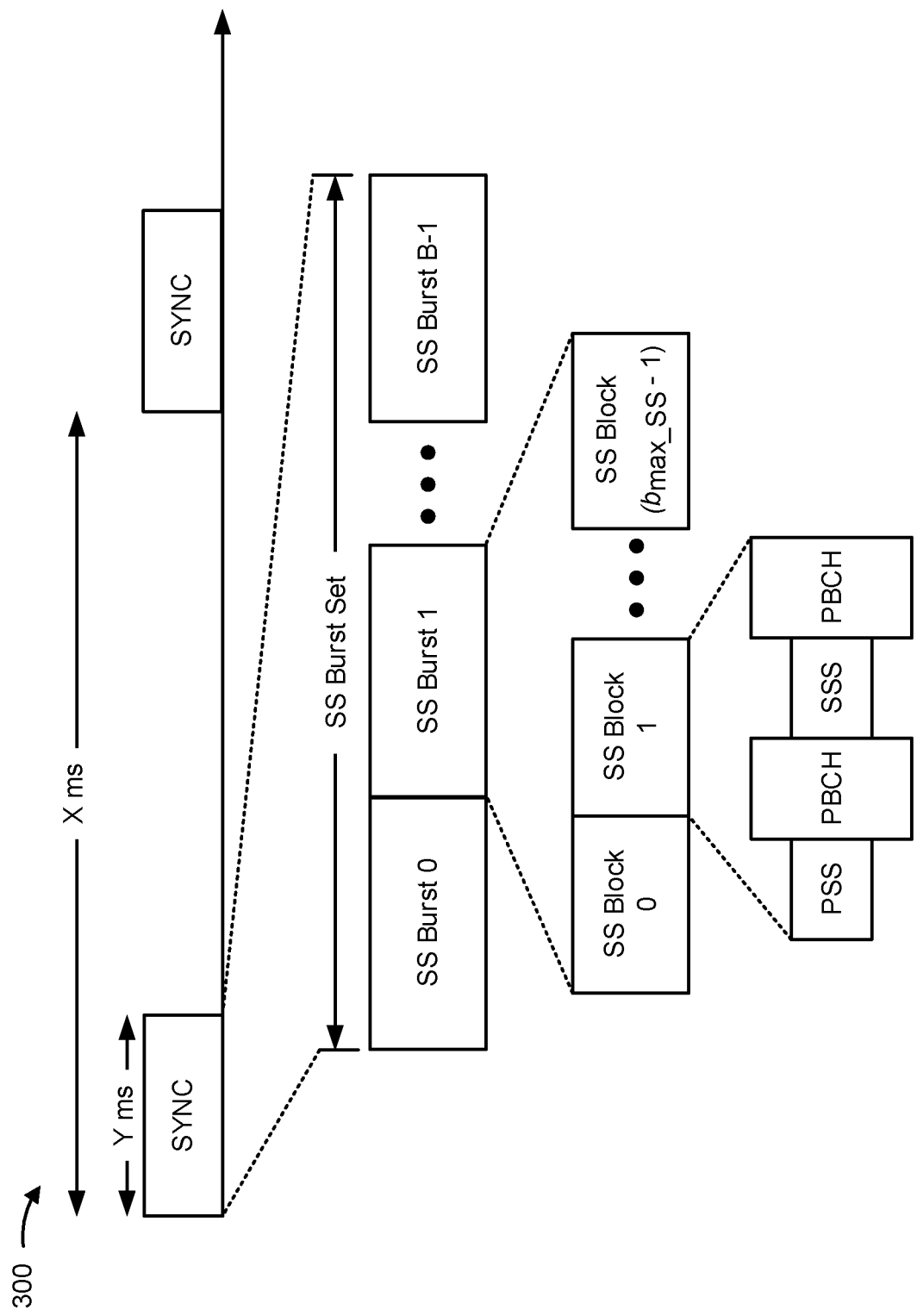
FIG. 3B is a block diagram illustrating an example synchronization communication hierarchy in a wireless communication network, in accordance with various aspects of the present disclosure.

FIG. 3B is a block diagram illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
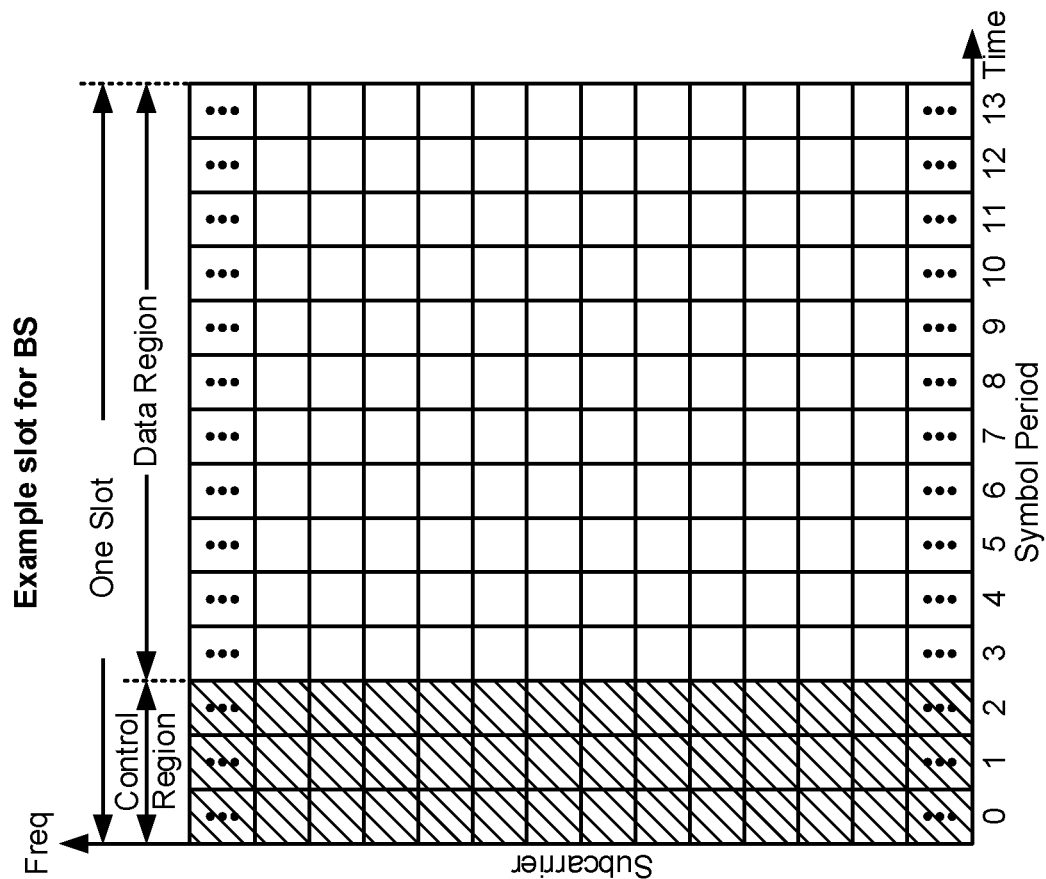
FIG. 4 is a block diagram illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, ... Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
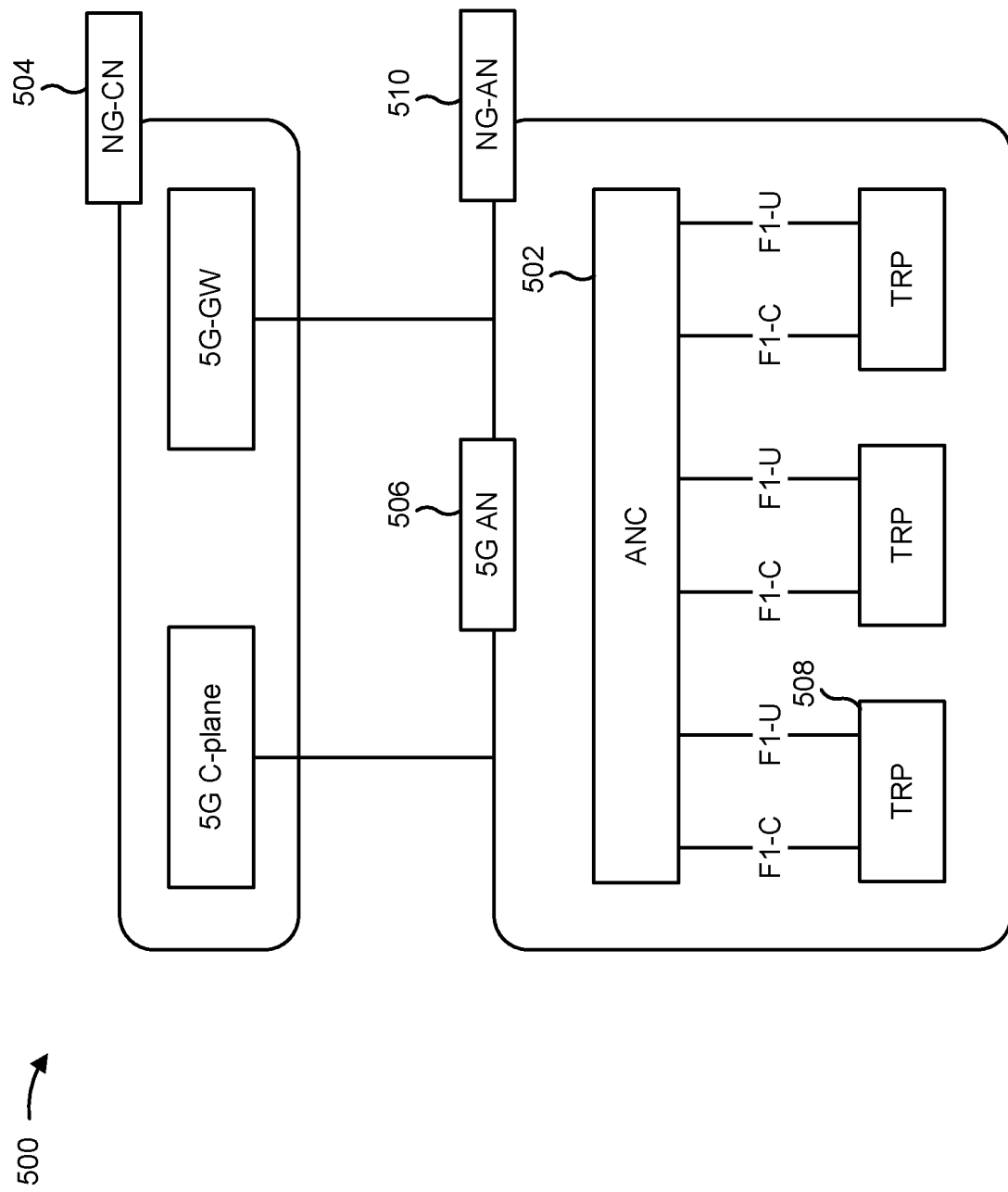
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, "TRP" may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul communication. The architecture may be defined to support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), or medium access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided as an example. Other examples may differ from what is described with regard to FIG. 5.

Figure 6:
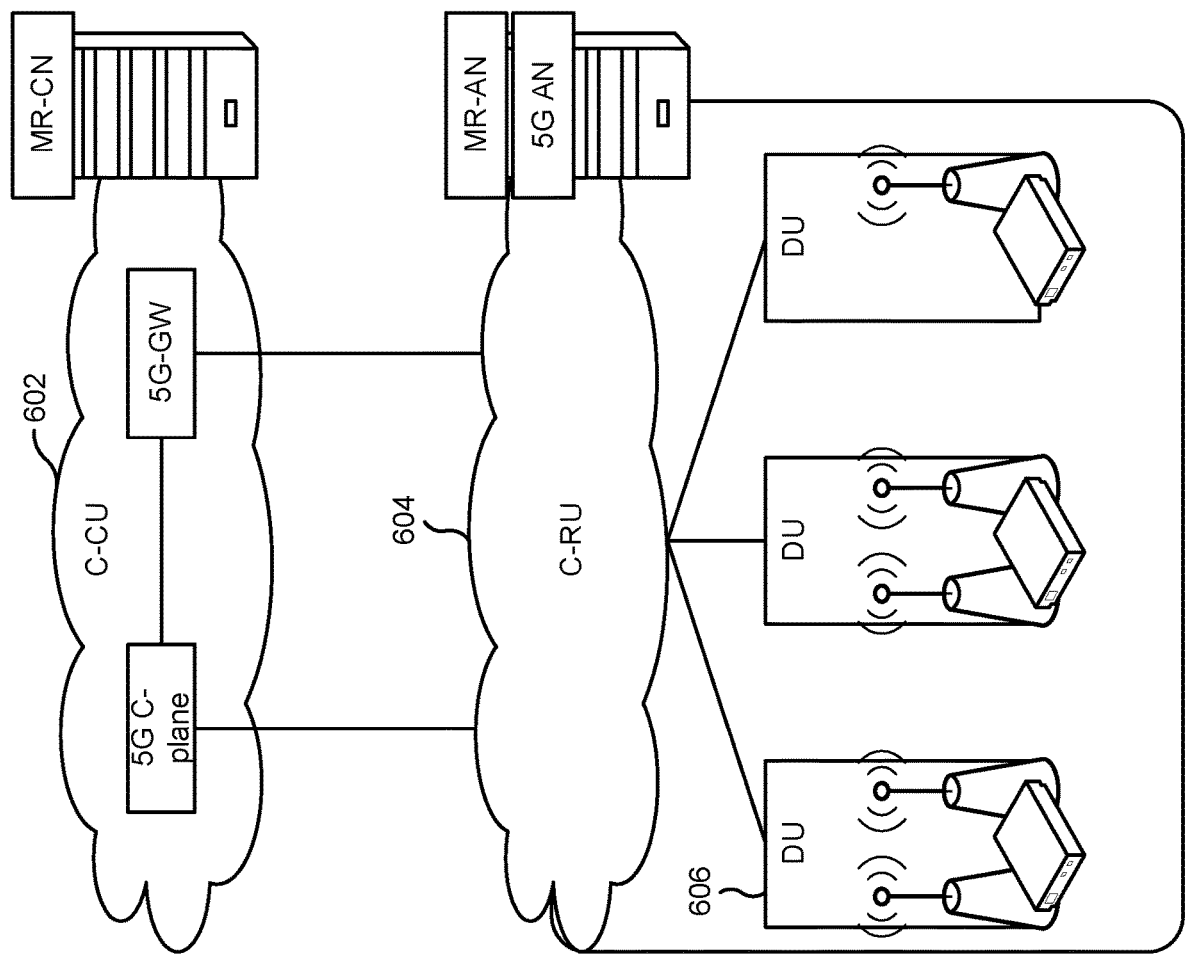
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided as an example. Other examples may differ from what is described with regard to FIG. 6.

In some communications systems, sidelink communication may be supported to enable a first UE (e.g., a source UE) to communicate with a second UE (e.g., a target UE) without relaying communication through one or more BSs. In this case, the target UE may receive information (e.g., control information or data) from the source UE via a sidelink, and may receive information from a serving BS via another link, such as a Uu (e.g., a link on a Uu interface) or an access link. Communications on the other link are controlled, for the UEs, by respective serving cells of the UEs. A BS may transmit a scheduling grant to a UE to enable the UE to transmit and/or receive information. For example, a BS may transmit a sidelink resource grant to a source UE to allocate resources for the source UE to transmit to the target UE. However, the target UE does not receive a grant for sidelink resources, and so may monitor the sidelink at all times that resources may be used on the sidelink, to attempt to receive information from the source UE. This may result in the target UE monitoring both the sidelink and the other link, which may result in an excessive utilization of power resources.

Some aspects described herein enable the BS to indicate a sidelink grant to a target UE to enable the target UE to selectively monitor the sidelink. In this case, the target UE may forgo monitoring the sidelink at one or more times in which resources are allocatable for the sidelink but for which resources have not been allocated for the target UE to receive on the sidelink. In this way, the BS and the target UE may enable a reduced utilization of power resources.

Figure 7:
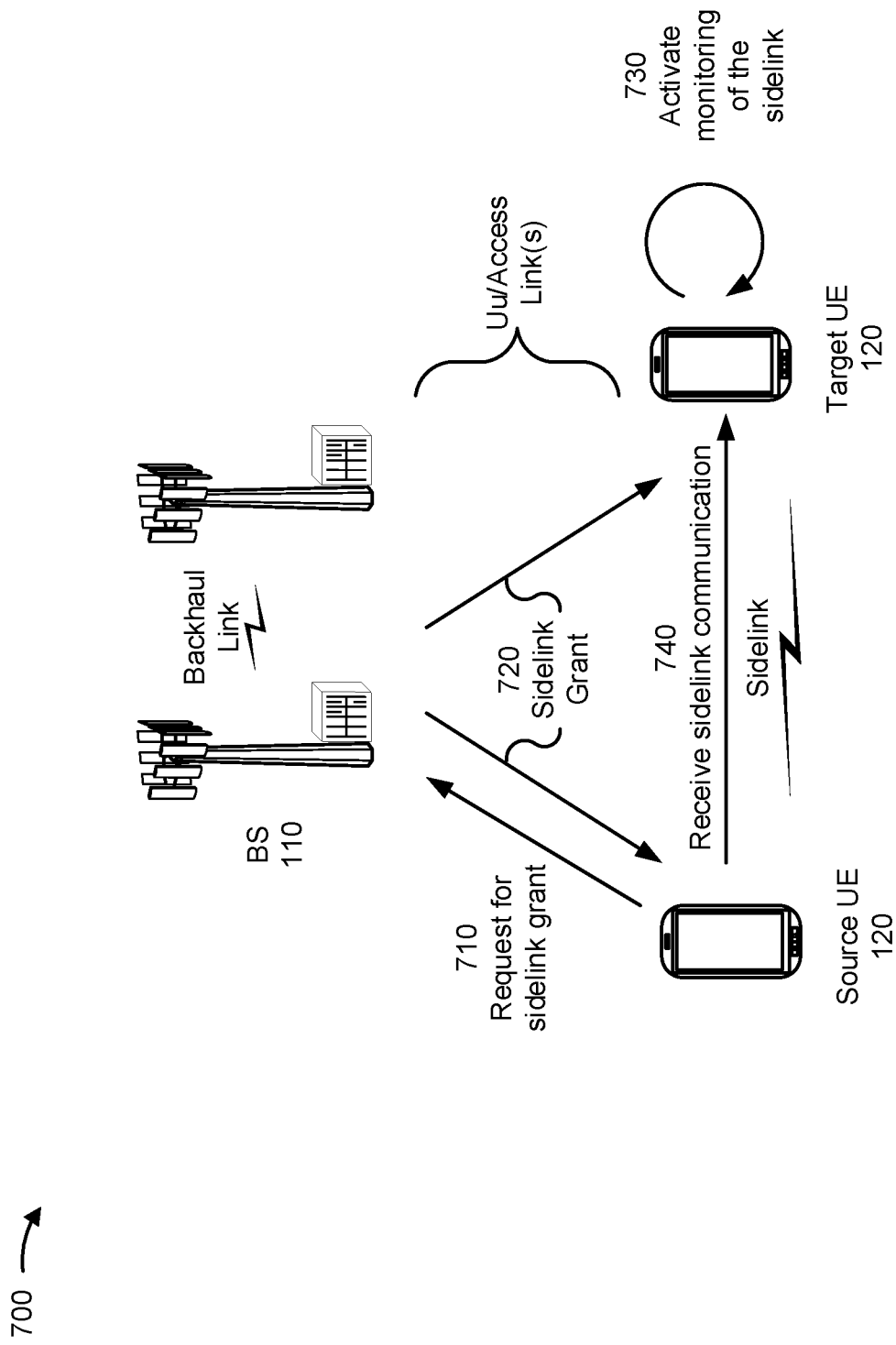
FIG. 7 illustrates an example of sidelink communication resource signaling, in accordance with various aspects of the present disclosure.

FIG. 7 illustrates an example 700 of sidelink communication resource signaling, in accordance with various aspects of the present disclosure. As shown in FIG. 7, example 700 includes one or more BSs 110, a source UE 120 that is to transmit a sidelink communication, and a target UE 120 that is to receive the target communication. For example, a single BS 110 may be a serving cell for both source UE 120 and target UE 120. Alternatively, a first BS 110 may be a serving cell for source UE 120 and may communicate via a backhaul link with a second BS 110 that is a serving cell for target UE 120.

As further shown in FIG. 7, and by reference number 710, BS 110 may receive a request for a sidelink grant. For example, when source UE 120 has data or control information queued for transmission to target UE 120, source UE 120 may request a grant for sidelink resources to transmit the data or control information to target UE 120 as a sidelink communication. Additionally, or alternatively, BS 110 may transmit or configure a periodic or semi-persistent sidelink grant to source UE 120 to enable source UE 120 to transmit to target UE 120 on the sidelink.

In some aspects, BS 110 may determine a UE identifier for target UE 120 based at least in part on the request for a sidelink grant. For example, source UE 120 may indicate the UE identifier for target UE 120 to BS 110 to enable BS 110 to provide an indication of the sidelink grant to target UE 120. Additionally, or alternatively, source UE 120 may indicate the UE identifier for target UE 120 to BS 110 to enable BS 110 to communicate with another BS 110 that is a serving cell of target UE 120 (e.g., via a backhaul link) to cause the other BS 110 to provide the indication of the grant to target UE 120.

In some aspects, BS 110 may determine resources to allocate to source UE 120 from a set of available resources. For example, resources may be partitioned (e.g., using time division multiplexing (TDM)) into a first type that is grantable by BS 110 and a second type that is not grantable by BS 110. In this case, BS 110 may select resources of the first type, and indicate the resources of the first type to source UE 120 to enable source UE 120 to transmit to target UE 120.

As further shown in FIG. 7, and by reference number 720, BS 110 may provide an indication of a sidelink grant. For example, BS 110 may transmit an indication of the sidelink grant to source UE 120, to target UE 120, and/or the like. In this way, BS 110 enables target UE 120 to monitor a sidelink when one or more resources are allocated for target UE 120 to receive a transmission via the sidelink, thereby reducing power resource utilization relative to target UE 120 monitoring the sidelink at all times. Additionally, or alternatively, BS 110 may transmit or configure a periodic or semi-persistent sidelink grant to target UE 120 to enable target UE 120 to monitor the sidelink periodically or semi-persistently, respectively.

In some aspects, BS 110 may provide the indication of the sidelink grant via a group-common control signal. For example, BS 110 may broadcast a single indication of the sidelink grant to source UE 120, target UE 120, one more other UEs 120, and/or the like. In this case, source UE 120 may process the single indication of the sidelink grant to determine that the sidelink grant includes an allocation of resources for sidelink transmission. Additionally, or alternatively, target UE 120 may process the single indication of the sidelink grant to determine that the sidelink grant includes an allocation of resources for sidelink reception. In some aspects, BS 110 may transmit the sidelink grant to a group of UEs 120 associated with a common radio network temporary identifier (RNTI) for a physical downlink control channel (PDCCH). For example, BS 110 may transmit a PDCCH transmission that identifies the sidelink grant for a group of UEs 120 associated with the common RNTI. Additionally, or alternatively, the indication of the sidelink grant may include one or more identifiers of the source UE 120, the target UE 120, and/or the like.

In some aspects, BS 110 may provide an indication of the sidelink grant via a plurality of messages. For example, BS 110 may transmit a first indication of the sidelink grant to source UE 120 and a second indication of the sidelink grant to target UE 120. Additionally, or alternatively, a first BS 110 may transmit a first indication of the sidelink grant to source UE 120 and a second BS 110 may transmit a second indication of the sidelink grant to target UE 120. In this case, one or more BSs 110 may transmit one or more indications of the sidelink grant via a control signal.

As further shown in FIG. 7, and by reference number 730, target UE 120 may activate monitoring of the sidelink. For example, target UE 120 may switch from monitoring the other link with BS 110 to monitoring the sidelink with source UE 120. Additionally, or alternatively, UE 120 may turn on monitoring of the sidelink and may continue to monitor the other link.

In some aspects, target UE 120 may monitor the sidelink based at least in part on a type of resource scheduled on the sidelink. For example, during a period of time for grantable resources (e.g., a first type of resource that may be granted by BS 110), UE 120 may monitor another link (e.g., an access link or Uu) and forgo monitoring the sidelink until a resource in the period of time that is identified for the sidelink grant. In this case, during another period of time for non-grantable resources (e.g., a second type of resources that is not controlled by BS 110), target UE 120 may monitor both the other link and the sidelink. In this case, target UE 120 reduces a utilization of power resources relative to monitoring the other link at all times (e.g., during all times associated with grantable resources).

As further shown in FIG. 7, and by reference number 740, source UE 120 may transmit and target UE 120 may receive a sidelink communication via the sidelink. For example, source UE 120 may transmit control information and/or data (e.g., a physical sidelink control channel (PSSCH) or physical sidelink shared channel (PSSCH)) to target UE 120 and target UE 120 may receive the control information and/or data. In this way, source UE 120 communicates with target UE 120 with reduced utilization of network resources relative to target UE 120 monitoring for communications from source UE 120 at all times. In some aspects, target UE 120 may switch from monitoring the sidelink after receiving the sidelink communication. For example, after receiving the sidelink communication, target UE 120 may stop monitoring the sidelink (e.g., until another indication of a sidelink grant is received) and may monitor the other link, thereby reducing a utilization of power resources relative to monitoring both the sidelink and the other link.

As indicated above, FIG. 7 is provided as an example. Other examples may differ from what is described with respect to FIG. 7.

Figure 8:
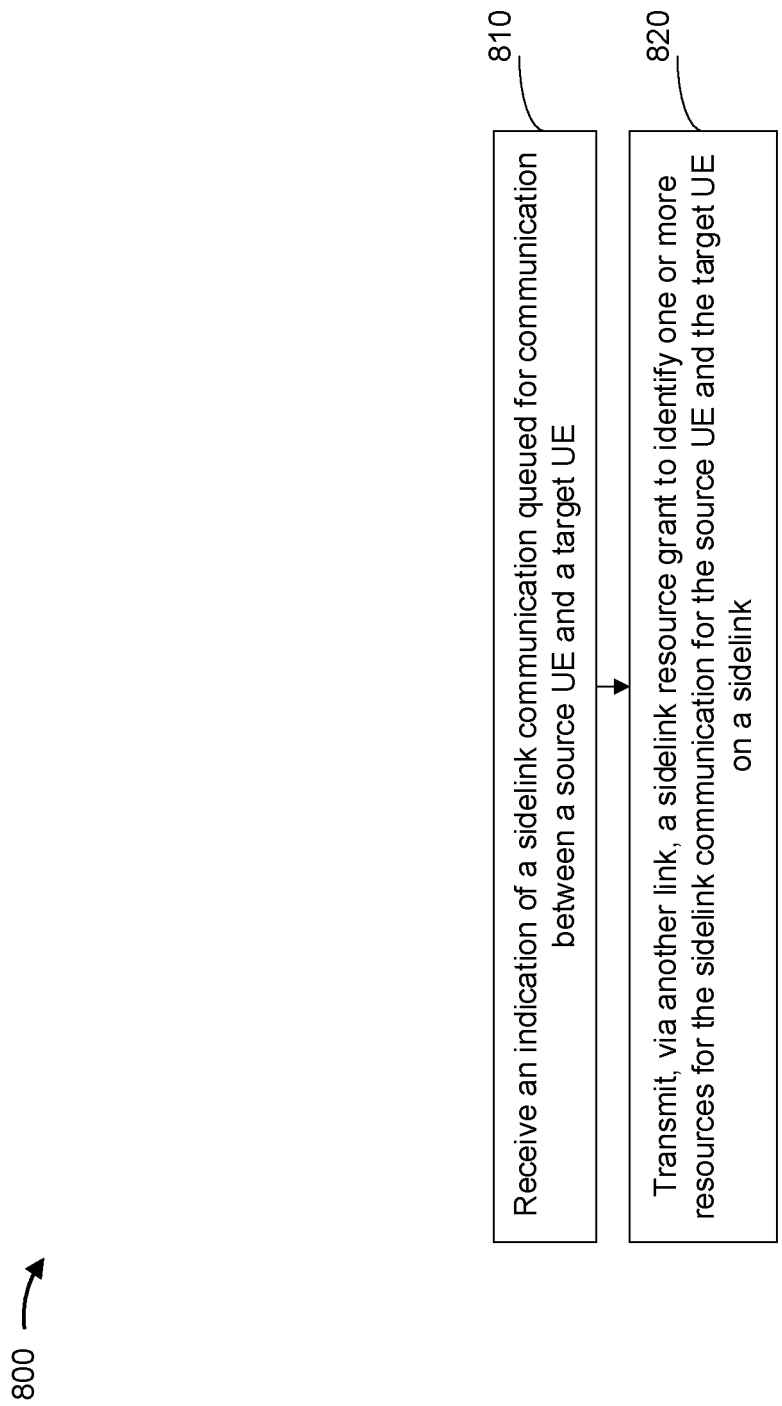
FIG. 8 illustrates an example process performed, for example, by a base station, in accordance with various aspects of the present disclosure.

FIG. 8 illustrates an example process 800 performed, for example, by a BS, in accordance with various aspects of the present disclosure. Example process 800 is an example where a BS (e.g., BS 110 and/or the like) performs operations associated with sidelink communication resource signaling.

As shown in FIG. 8, in some aspects, process 800 may include receiving an indication of a sidelink communication queued for communication between a source UE and a target UE (block 810). For example, the BS (e.g., using transmit processor 220, receive processor 238, controller/processor 240, memory 242, and/or the like) may receive an indication of a sidelink communication queued for communication between a source UE and a target UE, as described above.

As further shown in FIG. 8, in some aspects, process 800 may include transmitting, via another link, a sidelink resource grant to identify one or more resources for the sidelink communication for the source UE and the target UE on a sidelink (block 820). For example, the BS (e.g., using transmit processor 220, receive processor 238, controller/processor 240, memory 242, and/or the like) may transmit, via another link, a sidelink resource grant to identify one or more resources for the sidelink communication for the source UE and the target UE on a sidelink, as described above.

Process 800 may include additional aspects, such as any single aspect or any combination of aspects described below and/or in connection with one or more other processes described elsewhere herein.

In a first aspect, the sidelink resource grant is conveyed via a group-common control signal.

In a second aspect, alone or in combination with the first aspect, the sidelink resource grant is broadcast to at least one of the source UE or the target UE to identify the one or more resources.

In a third aspect, alone or in combination with one or more of the first and second aspects, the sidelink resource grant is conveyed via a physical downlink control channel message associated with a group radio network temporary identifier.

In a fourth aspect, alone or in combination with one or more of the first through third aspects, the sidelink resource grant is conveyed via a first control signal transmitted to the source UE and a second control signal transmitted to the target UE.

In a fifth aspect, alone or in combination with one or more of the first through fourth aspects, the sidelink resource grant is broadcast to a plurality of UEs to convey information identifying the one or more resources to the target UE.

In a sixth aspect, alone or in combination with one or more of the first through fifth aspects, process 800 includes receiving, from the source UE, an indication of a UE identifier associated with the target UE, and transmitting the sidelink resource grant via a message to the target UE based at least in part on the indication of the UE identifier for the target UE.

In a seventh aspect, alone or in combination with one or more of the first through sixth aspects, the sidelink resource grant to the target UE is through downlink control information with a cell radio network temporary identifier for the target UE In an eighth aspect, alone or in combination with one or more of the first through seventh aspects, the one or more resources are partitioned into a first type grantable for reception operation and a second type not grantable for reception operation.

In a ninth aspect, alone or in combination with one or more of the first through eighth aspects, the other link is a Uu or access link.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
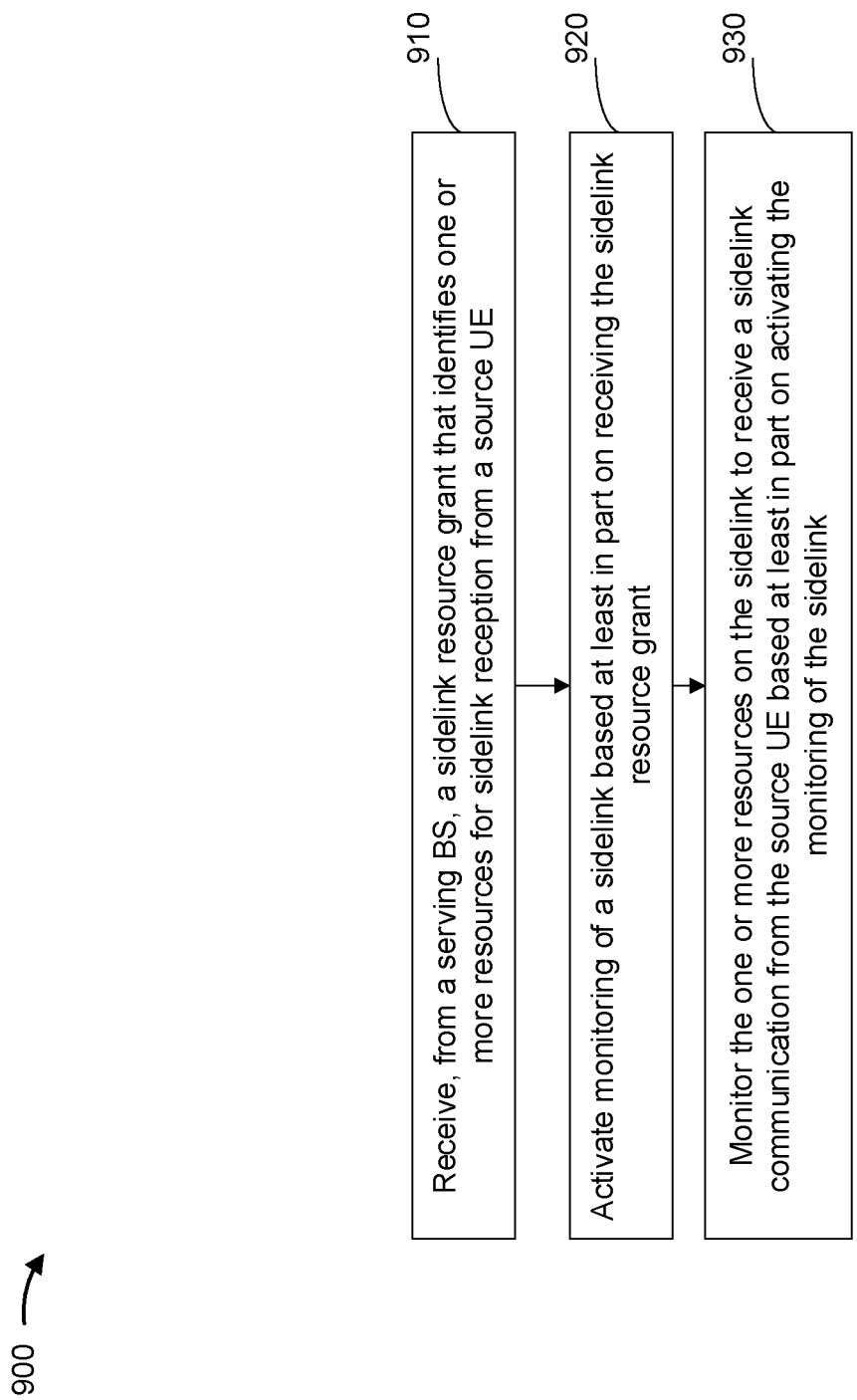
FIG. 9 illustrates an example process performed, for example, by a target user equipment, in accordance with various aspects of the present disclosure.

FIG. 9 illustrates an example process 900 performed, for example, by a UE, in accordance with various aspects of the present disclosure. Example process 900 is an example where a target UE (e.g., UE 120 and/or the like) performs operations associated with sidelink communication resource signaling.

As shown in FIG. 9, in some aspects, process 900 may include receiving, from a serving base station (BS), a sidelink resource grant that identifies one or more resources for sidelink reception from a source UE (block 910). For example, the target UE (e.g., using receive processor 258, transmit processor 264, controller/processor 280, memory 282, and/or the like) may receive, from a serving BS, a sidelink resource grant that identifies one or more resources for sidelink reception from a source UE, as described above.

As further shown in FIG. 9, in some aspects, process 900 may include activating monitoring of a sidelink based at least in part on receiving the sidelink resource grant (block 920). For example, the target UE (e.g., using receive processor 258, transmit processor 264, controller/processor 280, memory 282, and/or the like) may activate monitoring of a sidelink based at least in part on receiving the sidelink resource grant, as described above.

As further shown in FIG. 9, in some aspects, process 900 may include monitoring the one or more resources on the sidelink to receive a sidelink communication from the source UE based at least in part on activating the monitoring of the sidelink (block 930). For example, the target UE (e.g., using receive processor 258, transmit processor 264, controller/processor 280, memory 282, and/or the like) may monitor the one or more resources on the sidelink to receive a sidelink communication from the source UE based at least in part on activating the monitoring of the sidelink, as described above.

Process 900 may include additional aspects, such as any single aspect or any combination of aspects described below and/or in connection with one or more other processes described elsewhere herein.

In a first aspect, process 900 includes monitoring one or more other resources, on another link, not identified in the sidelink resource grant.

In a second aspect, alone or in combination with the first aspect, the one or more resources are a first type of resource that is grantable for reception operation, and process 900 includes monitoring the sidelink for a second type of resource that is not grantable for reception operation, where the monitoring the sidelink for the second type of resource is not based at least in part on receiving a sidelink resource grant.

In a third aspect, alone or in combination with one or more of the first and second aspects, the sidelink resource grant is conveyed via a group-common control signal.

In a fourth aspect, alone or in combination with one or more of the first through third aspects, the sidelink resource grant is a broadcast signal.

In a fifth aspect, alone or in combination with one or more of the first through fourth aspects, the sidelink resource grant is conveyed via a physical downlink control channel message associated with a group radio network temporary identifier.

In a sixth aspect, alone or in combination with one or more of the first through fifth aspects, the sidelink resource grant is conveyed via a control signal transmitted to the target UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
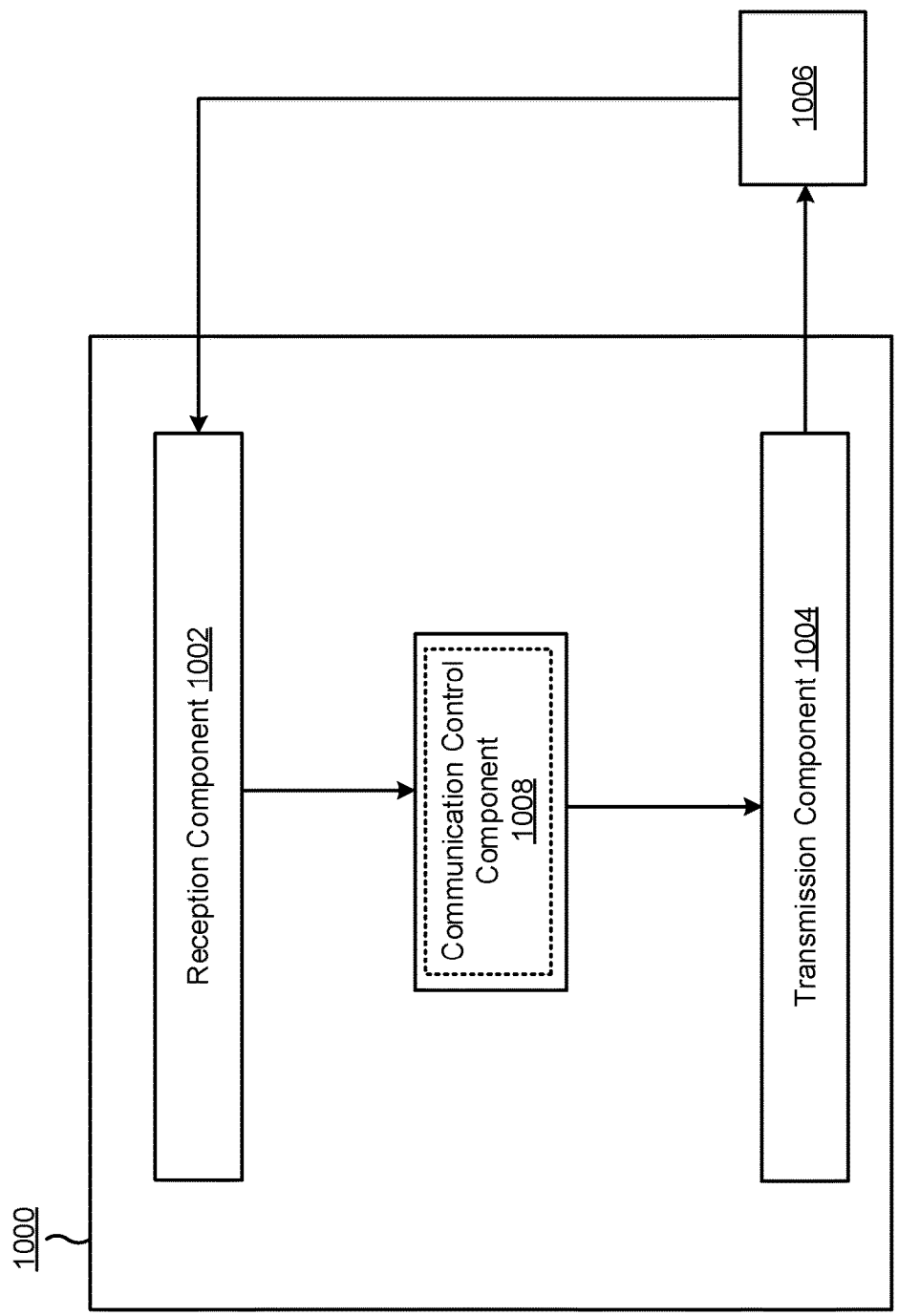
FIG. 10 is a block diagram of an example apparatus for wireless communication, in accordance with various aspects of the present disclosure.

FIG. 10 is a block diagram of an example apparatus 1000 for wireless communication. The apparatus 1000 may be a B S, or a B S may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1006 may include one or more of a communication control component 1008 among other examples.

In some aspects, the apparatus 1000 may be configured to perform one or more operations described herein in connection with FIG. 7. Additionally or alternatively, the apparatus 1000 may be configured to perform one or more processes described herein, such as process 800 of FIG. 8 among other examples. In some aspects, the apparatus 1000 and/or one or more components shown in FIG. 10 may include one or more components of the BS described above in connection with FIG. 2. Additionally, or alternatively, one or more components shown in FIG. 10 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the BS described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the BS described above in connection with FIG. 2. In some aspects, the transmission component 1004 may be collocated with the reception component 1002 in a transceiver.

The reception component 1002 may receive an indication of a sidelink communication queued for communication between a source UE (e.g., a first apparatus 1006) and a target UE (e.g., a second apparatus 1006), receive, from the source UE, an indication of a UE identifier associated with the target UE, and/or the like. The communication control component 1008 may control reception component 1002 and/or transmission component 1004 to enable receipt of an indication of a sidelink communication and to enable transmission of a sidelink resource grant, respectively. The transmission component 1004 may transmit, via another link, a sidelink resource grant to identify one or more resources for the sidelink communication for the source UE and the target UE on a sidelink, transmitting the sidelink resource grant via a message to the target UE based at least in part on the indication of the UE identifier for the target UE, and/or the like.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

Figure 11:
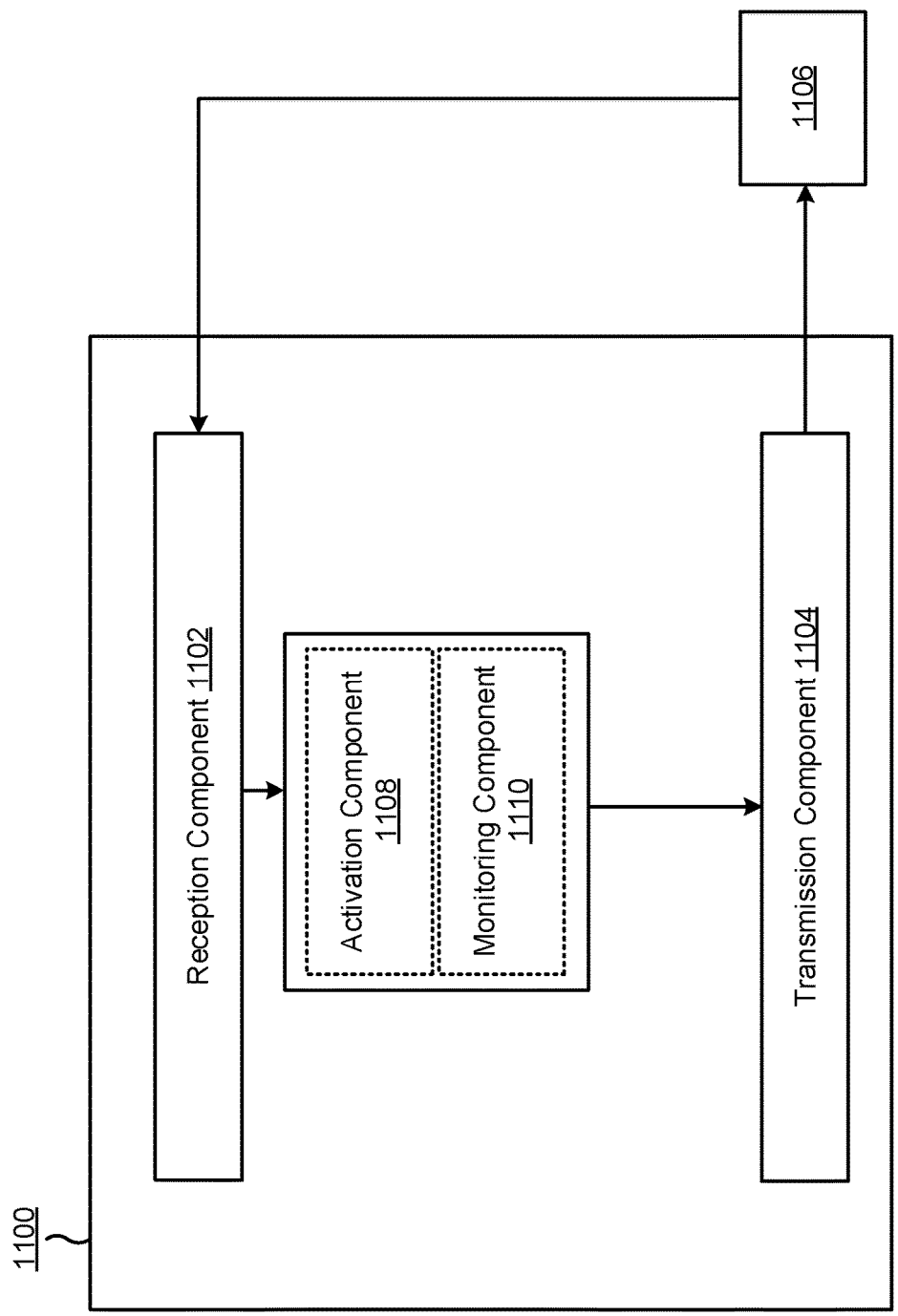
FIG. 11 is a block diagram of an example apparatus for wireless communication, in accordance with various aspects of the present disclosure.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1106 may include one or more of an activation component 1108 or a monitoring component 1110, among other examples.

In some aspects, the apparatus 1100 may be configured to perform one or more operations described herein in connection with FIG. 7. Additionally or alternatively, the apparatus 1100 may be configured to perform one or more processes described herein, such as process 900 of FIG. 9 among other processes. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be collocated with the reception component 1102 in a transceiver.

The reception component 1102 may receive, from a serving base station (BS), a sidelink resource grant that identifies one or more resources for sidelink reception from a source UE. The activation component 1108 may activate monitoring of a sidelink based at least in part on receiving the sidelink resource grant. The transmission component 1104 may monitor the one or more resources on the sidelink to receive a sidelink communication from the source UE based at least in part on activating the monitoring of the sidelink and/or monitor the sidelink for a second type of resource that is not grantable for reception operation.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a network entity, comprising:

receiving an indication of a sidelink communication queued for communication between a source user equipment (UE) and a target UE; and transmitting, by the network entity, a sidelink resource grant directly to the source UE and the target UE based on the source UE and the target UE being associated with a common radio network temporary identifier (RNTI), wherein the sidelink resource grant identifies one or more resources for the sidelink communication for the source UE and the target UE on a sidelink.

2. The method of claim 1, wherein the is sidelink resource grant is transmitted via a Uu or access link.

3. The method of claim 1, wherein the sidelink resource grant is conveyed via a group-common control signal.

4. The method of claim 1, wherein the sidelink resource grant is conveyed via a physical downlink control channel message associated with the common RNTI.

5. The method of claim 1, wherein the sidelink resource grant is conveyed via a first control signal transmitted to the source UE and a second control signal transmitted to the target UE.

6. The method of claim 1, wherein the one or more resources are partitioned into a first type grantable for reception operation and a second type not grantable for reception operation.

7. A method of wireless communication performed by a target user equipment (UE), comprising:

receiving, from a network entity, a sidelink resource grant that is transmitted directly to the target UE and a source UE based on the source UE and the target UE being associated with a common radio network temporary identifier (RNTI), wherein the sidelink resource grant identifies one or more resources for sidelink reception from the source UE;

activating monitoring of a sidelink based at least in part on receiving the sidelink resource grant; and monitoring the one or more resources on the sidelink to receive a sidelink communication from the source UE based at least in part on activating the monitoring of the sidelink.

8. The method of claim 7, further comprising:
monitoring one or more other resources, on another link, not identified in the sidelink resource grant.

9. The method of claim 7, wherein the one or more resources are a first type of resource that is grantable for reception operation,
wherein the method further comprises:
monitoring the sidelink for a second type of resource that is not grantable for reception operation, and
wherein the monitoring the sidelink for the second type of resource is not based on receiving the sidelink resource grant.

10. The method of claim 7, wherein the sidelink resource grant is conveyed via a group-common control signal.

11. The method of claim 7, wherein the sidelink resource grant is a broadcast signal.

12. The method of claim 7, wherein the sidelink resource grant is conveyed via a physical downlink control channel message associated with the common RNTI.

13. The method of claim 7, wherein the sidelink resource grant is conveyed via a control signal transmitted to the target UE.

14. A network entity for wireless communication, comprising:
a memory; and
one or more processors, coupled to the memory, configured to:

receive an indication of a sidelink communication queued for communication between a source user equipment (UE) and a target UE; and transmit, a sidelink resource grant directly to the source UE and the target UE based on the source UE and the target UE being associated with a common radio network temporary identifier (RNTI), wherein the sidelink resource grant identifies one or more resources for the sidelink communication for the source UE and the target UE on a sidelink.

15. The network entity of claim 14, wherein the sidelink resource grant is transmitted via a Uu or access link.

16. The network entity of claim 14, wherein the sidelink resource grant is conveyed via a group-common control signal.

17. The network entity of claim 14, wherein the sidelink resource grant is conveyed via a physical downlink control channel message associated with the common RNTI.

18. The network entity of claim 14, wherein the sidelink resource grant is conveyed via a first control signal transmitted to the source UE and a second control signal transmitted to the target UE.

19. A target user equipment (UE) for wireless communication, comprising:
a memory; and
one or more processors, coupled to the memory, configured to:

receive, from a network entity, a sidelink resource grant that is transmitted directly to the target UE and a source UE based on the source UE and the target UE being associated with a common radio network temporary identifier (RNTI), wherein the sidelink resource grant identifies one or more resources for sidelink reception from the source UE;

activate monitoring of a sidelink based at least in part on receiving the sidelink resource grant; and monitor the one or more resources on the sidelink to receive a sidelink communication from the source UE based at least in part on activating the monitoring of the sidelink.

20. The target UE of claim 19, wherein the one or more processors are further configured to:
monitor one or more other resources, on another link, not identified in the sidelink resource grant.

21. The target UE of claim 19, wherein the one or more resources are a first type of resource that is grantable for reception operation,
wherein the one or more processors are configured to monitor the sidelink for a second type of resource that is not grantable for reception operation, and
wherein the monitoring the sidelink for the second type of resource is not based at least in part on receiving the sidelink resource grant.

22. The target UE of claim 19, wherein the sidelink resource grant is conveyed via a group-common control signal.

23. The target UE of claim 19, wherein the sidelink resource grant is a broadcast signal.

24. The target UE of claim 19, wherein the sidelink resource grant is a periodic or semi-persistent sidelink grant.

25. The method of claim 7, wherein the sidelink resource grant is a periodic or semi-persistent sidelink grant.

26. The network entity of claim 14, wherein the sidelink resource grant is a periodic or semi-persistent sidelink grant.

27. The method of claim 1, wherein the sidelink resource grant is a periodic or semi-persistent sidelink grant.

28. The method of claim 1, wherein an indication of the sidelink grant includes identifiers of the source UE and the target UE.

29. The method of claim 7, wherein an indication of the sidelink grant includes identifiers of the source UE and the target UE.

30. The network entity of claim 14, wherein an indication of the sidelink grant includes identifiers of the source UE and the target UE.

* * * * *